(12) United States Patent
Wang

(10) Patent No.: US 10,121,052 B2
(45) Date of Patent: Nov. 6, 2018

(54) FINGERPRINT IDENTIFICATION DEVICE AND ELECTRONIC DEVICE USING SAME

(71) Applicant: MiiCs & Partners (Shenzhen) Co., Ltd., Shenzhen (CN)

(72) Inventor: Juan Wang, Shenzhen (CN)

(73) Assignees: Interface Technology (ChengDu) Co., Ltd., Chengdu (CN); INTERFACE OPTOELECTRONICS (SHENZHEN) CO., LTD., Shenzhen (CN)

( * ) Notice: Subject to any disclaimer, the term of this patent is extended or adjusted under 35 U.S.C. 154(b) by 300 days.

(21) Appl. No.: 15/088,721

(22) Filed: Apr. 1, 2016

(65) Prior Publication Data

US 2017/0169279 A1    Jun. 15, 2017

(30) Foreign Application Priority Data

Dec. 14, 2015    (CN) .......................... 2015 1 0922422

(51) Int. Cl.
*G06K 9/28*    (2006.01)
*G06K 9/00*    (2006.01)
*G06F 21/32*    (2013.01)

(52) U.S. Cl.
CPC .......... *G06K 9/00053* (2013.01); *G06F 21/32* (2013.01)

(58) Field of Classification Search
CPC .................... G06K 9/0002; G06K 9/00053
See application file for complete search history.

(56) References Cited

U.S. PATENT DOCUMENTS

| | | | | |
|---|---|---|---|---|
| 9,613,246 | B1* | 4/2017 | Gozzini | G06K 9/0002 |
| 9,817,108 | B2* | 11/2017 | Kuo | G01S 7/52017 |
| 2013/0062182 | A1* | 3/2013 | Tokura | H03K 17/962 |
| | | | | 200/600 |
| 2015/0187707 | A1* | 7/2015 | Lee | H01L 23/562 |
| | | | | 324/663 |
| 2016/0046052 | A1* | 2/2016 | Ito | B32B 7/02 |
| | | | | 428/354 |
| 2016/0335468 | A1* | 11/2016 | Long | G06K 9/0002 |

* cited by examiner

*Primary Examiner* — Brian Werner
(74) *Attorney, Agent, or Firm* — ScienBiziP, P.C.

(57) ABSTRACT

A fingerprint identification device includes a cover, a light-shielding layer formed on the cover, an intermediate layer formed on the light-shielding layer, an adhesive layer formed on the intermediate layer, a protection layer formed on the adhesive layer, and a fingerprint identification element. The fingerprint identification element is configured to identify a fingerprint. The fingerprint identification element is embedded in the protection layer.

16 Claims, 6 Drawing Sheets

FINGERPRINT IDENTIFICATION DEVICE AND ELECTRONIC DEVICE USING SAME

FIELD

The subject matter herein generally relates to a fingerprint identification device and an electronic device using the fingerprint identification device.

BACKGROUND

To perform certain functions an electronic device may require authentication or a password. One may provide authentication by using fingerprint identification devices. Many electronic devices include fingerprint identification devices.

BRIEF DESCRIPTION OF THE DRAWINGS

Implementations of the present technology will now be described, by way of example only, with reference to the attached figures.

DETAILED DESCRIPTION

Figure 1:
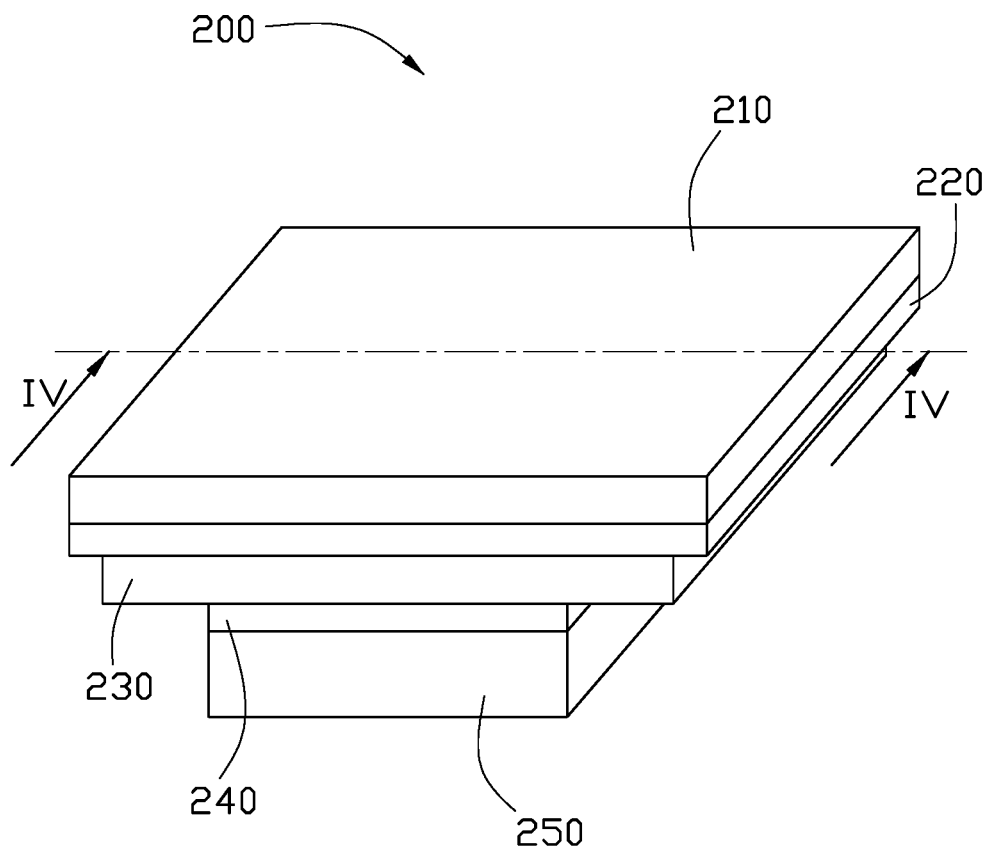
FIG. 1 is an isometric view of an exemplary embodiment of a fingerprint identification device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections.

The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
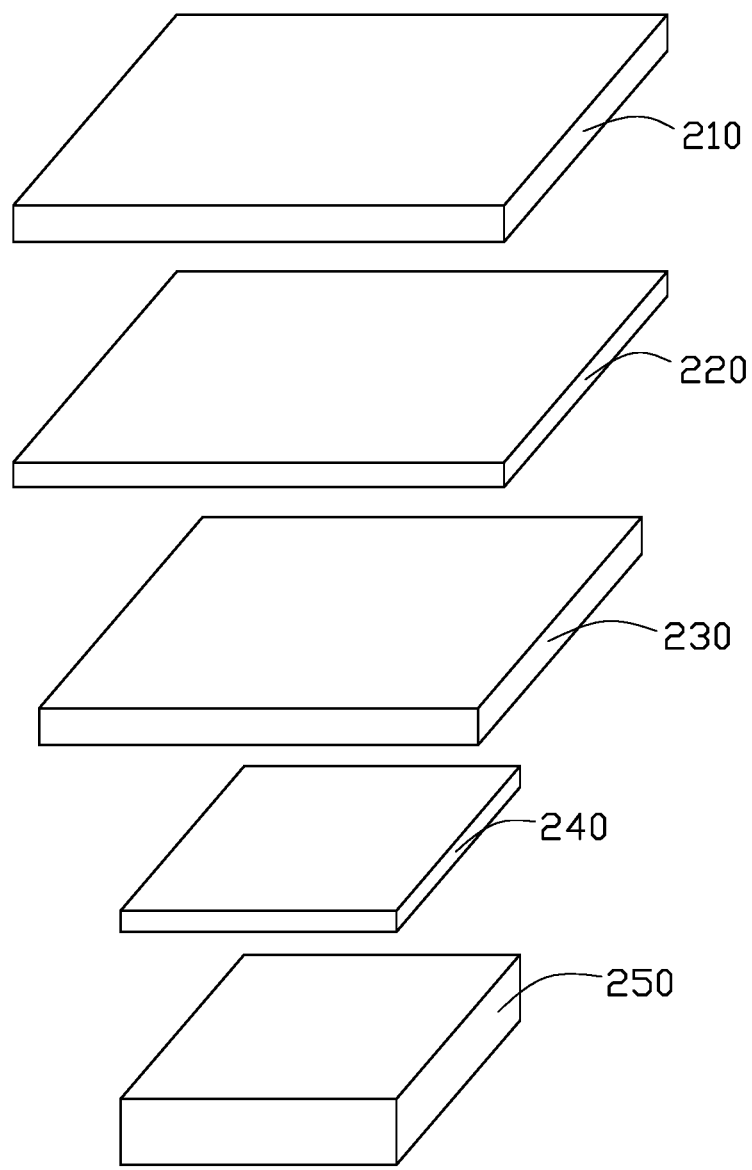
FIG. 2 is an exploded view of the fingerprint identification device of FIG. 1.
Figure 3:
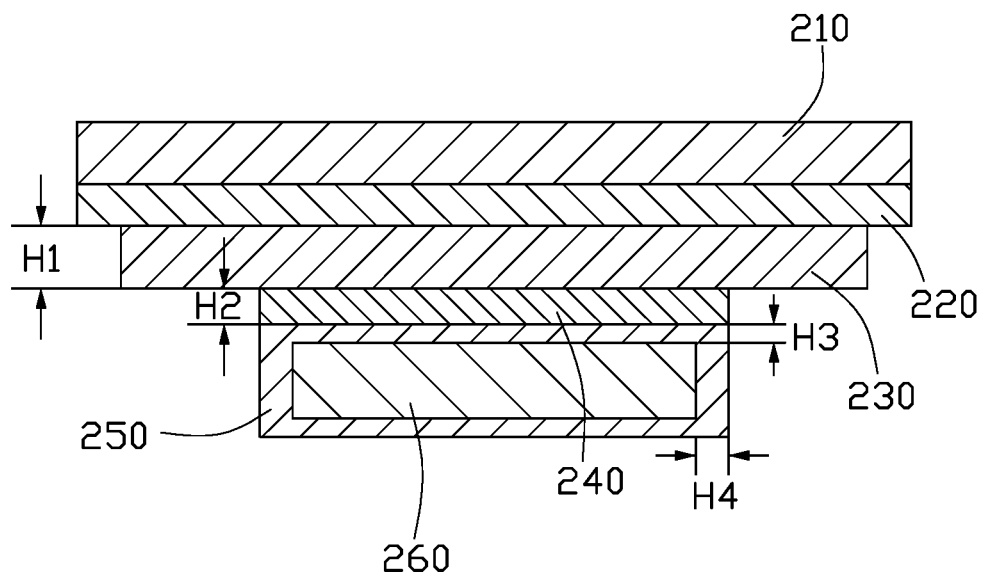
FIG. 3 is a cross-sectional view along line IV-IV of FIG. 1.

FIG. 1 through FIG. 3 illustrate a fingerprint identification device 200 according to an exemplary embodiment. The fingerprint identification device 200 includes a cover 210, a light-shielding layer 220 formed on the cover 210, an intermediate layer 230 formed on the light-shielding layer 220, an adhesive layer 240 formed on the intermediate layer 230, a protection layer 250 formed on the adhesive layer 240, and a fingerprint identification element 260. The cover 210, the light-shielding layer 220, the intermediate layer 230, the adhesive layer 240, and the protection layer 250 are stacked in that order. The fingerprint identification element 260 is embedded in the protection layer 250. As shown in FIG. 3, the fingerprint identification element 260 is not exposed from the protection layer 250.

The cover 210 defines a top end of the fingerprint identification device 200. The cover 210 is configured to protect the fingerprint identification device 200. In at least one embodiment, the cover 210 is made of transparent glass. In other embodiments, the cover 210 may be made of other light-transmitting materials, such as transparent polymer.

The light-shielding layer 220 may be formed on the cover 210 by spraying or coating. The light-shielding layer 220 is configured to decorate the fingerprint identification device 200 and to mask other elements of the fingerprint identification device 200. The light-shielding layer 220 may be made of a light-shielding ink. In at least one embodiment, the light-shielding layer 220 is made of a light-shielding ink mainly containing epoxy resin.

The intermediate layer 230 is positioned between the light-shielding layer 220 and the adhesive layer 240. The intermediate layer 230 is made of a material mainly containing acrylic resin. The intermediate layer 230 serves to separate the light-shielding layer 220 from the adhesive layer 240. The fingerprint identification device 200 can be recycled by dipping the device 200 in an organic solvent to disassemble the components of the fingerprint identification device 200. The intermediate layer 230 can be dissolved in the organic solvent, so the light-shielding layer 220 and the adhesive layer 240 can be easily stripped from the intermediate layer 230.

The adhesive layer 240 is made of an adhesive containing epoxy resin. The protection layer 250 is made of a material mainly containing epoxide resin and the protection layer 250 is insoluble in the organic solvent. The protection layer 250 is coupled to the intermediate layer 230 via the adhesive layer 240. The adhesive layer 240 is positioned between the intermediate layer 230 and the protection layer 250.

Figure 4:
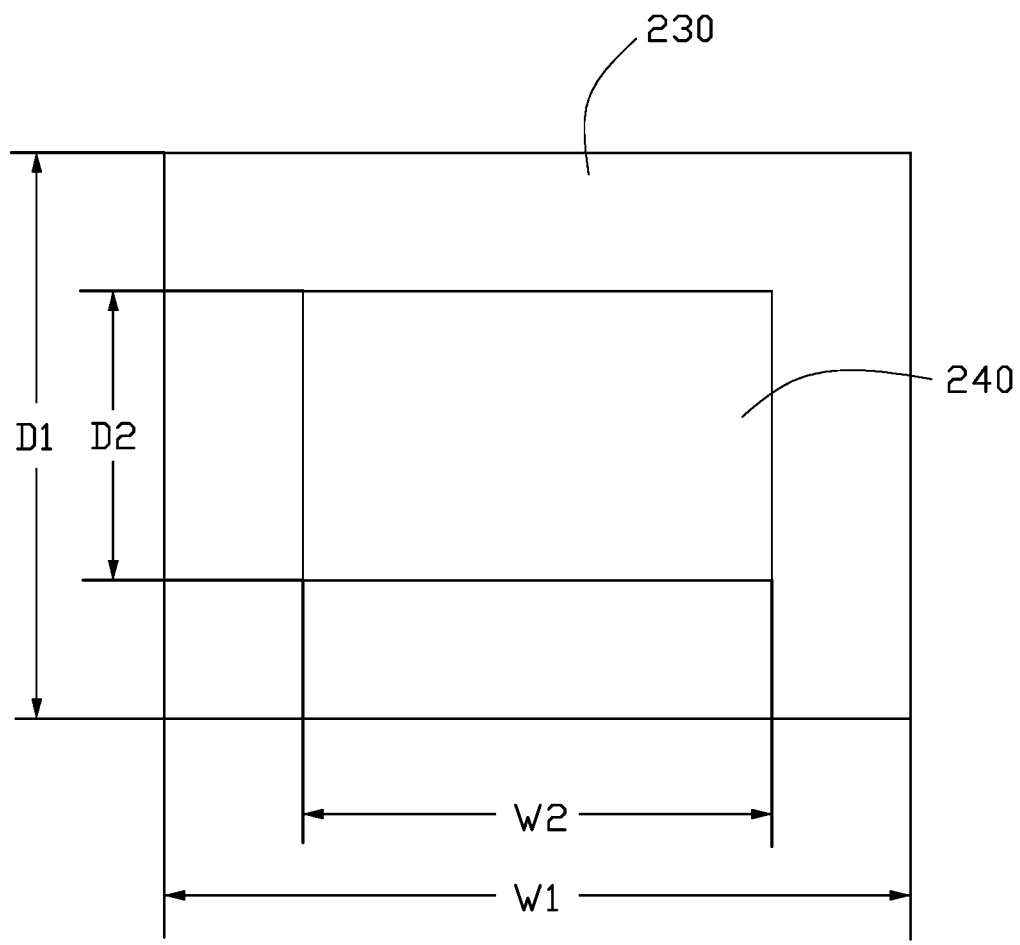
FIG. 4 is a plan view of an adhesive layer and an intermediate layer in the fingerprint identification device of FIG. 1.

FIG. 4 illustrates the adhesive layer 240 and the intermediate layer 230. Both the adhesive layer 240 and the intermediate layer 230 have a rectangular shape. The intermediate layer 230 has a length of D1 and a width of W1. The adhesive layer 240 has a length of D2 and a width of W2. In at least one embodiment, D1 is larger than D2, and W1 is larger than W2. The intermediate layer 230 has a size larger than the adhesive layer 240 so as to completely cover the adhesive layer 240. In the illustrated embodiment, D1 is at least 50 μm larger than D2, and W1 is at least 50 μm larger than W2. The intermediate layer 230 has a thickness of H1 where H1 is in a range from 5 μm to 10 μm. The adhesive layer 240 has a thickness of H2 where H2 is in a range from 2 μm to 10 μm.

The thickness H1 of the intermediate layer 230 represents a distance from a surface of the intermediate layer 230 adjacent to the light-shielding layer 220 to another surface of the intermediate layer 230 adjacent to the adhesive layer 240. The thickness H2 of the adhesive layer 240 represents a distance from a surface of the adhesive layer 240 adjacent to the intermediate layer 230 to another surface of the adhesive layer 240 adjacent to the protection layer 250.

The fingerprint identification element 260 is embedded in the protection layer 250, and the protection layer 250 completely covers the fingerprint identification element 260. In FIG. 4, distance H3 represents a distance from a surface of the protection layer 250 adjacent to the adhesive layer 240 to the fingerprint identification element 260, and distance H4 represents a distance from a surface of the protection layer 250 parallel to direction of the thickness H1 or H2 to the fingerprint identification element 260. In at least one embodiment, distance H3 is in a range from about 1 μm to about 10 μm, and distance H4 is more than 5 μm. The total of the thickness H1 of the intermediate layer 230, the thickness H2 of the adhesive layer 240, and the distance H3 is less than 20 μm.

Figure 5:
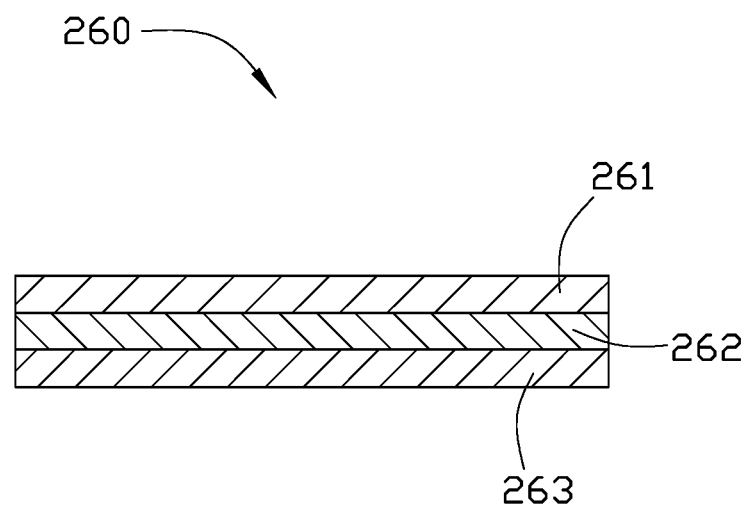
FIG. 5 is a cross-sectional view of an exemplary embodiment of a fingerprint identification element in the fingerprint identification device of FIG. 1.

FIG. 5 illustrates a fingerprint identification element 260 according to an exemplary embodiment. The fingerprint identification element 260 may be a commonly-used fingerprint identification element utilizing ultrasonic waves. The fingerprint identification element 260 is configured to identifying fingerprint and comprises a signal receiving layer 261, a thin film transistor array 262, and a signal sending layer 263. The thin film transistor array 262 is located between the signal receiving layer 261 and the signal sending layer 263. The signal sending layer 263 is formed on a surface of the thin film transistor array 262 adjacent to the adhesive layer 240.

The signal sending layer 263 vibrates when a voltage is applied and ultrasonic waves are emitted to the signal receiving layer 261. The signal receiving layer 261 is configured to receive ultrasonic signals reflected by fingers of a user, convert the ultrasonic signals to be electronic signals, and send the electronic signals to the thin film transistor array 262. The thin film transistor array 262 is configured for acquiring gray level images of fingerprints according to the electronic signals from the signal receiving layer 261.

In at least one embodiment, the fingerprint identification element 260 further comprises a circuit board (not shown) to control the fingerprint identification element 260, a first electrode layer to apply a voltage to the signal sending layer 263, and a second electrode layer to transmit electronic signals from the signal receiving layer 261.

Figure 6:
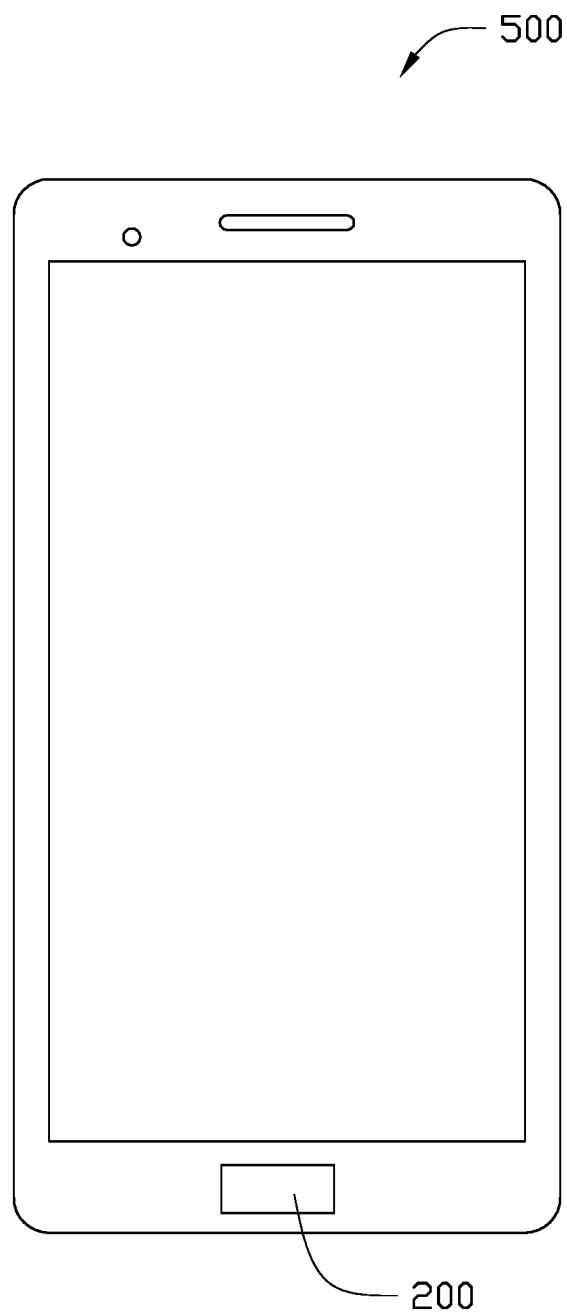
FIG. 6 is an isometric view of an exemplary embodiment of an electronic device using the fingerprint identification device of FIG. 1.

FIG. 6 illustrates an electronic device using the fingerprint identification device 200. The electronic device 500 may be a mobile phone or any other electronic device commonly used. In the illustrated embodiment, the fingerprint identification device 200 is mounted on the electronic device 500 and forms a button (such as Home button) of the electronic device 500. In other embodiments, the fingerprint identification device 200 may be mounted on other positions of the electronic device 500 and not form a button of the electronic device 500.

To recycle the fingerprint identification device 200, the device 200 can be disassembled by dipping in an organic solvent. The intermediate layer 230 dissolves in the organic solvent, thus the light-shielding layer 220 and the adhesive layer 240 can separated from each other easily. As such, the cover 210 with the light-shielding layer 220 can be recycled. The protection layer 250 cannot dissolve in the organic solvent, thus the protection layer 250 effectively protects the fingerprint identification element 260 from being destroyed by the organic solvent. As such, the fingerprint identification element 260 can also be recycled.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A fingerprint identification device comprising:
a cover;
a light-shielding layer formed on the cover;
an adhesive layer formed on the light-shielding layer;
an intermediate layer between the light-shielding layer and the adhesive layer;
a protection layer formed on the adhesive layer; and
a fingerprint identification element configured to identify a fingerprint, and the fingerprint identification element being embedded in the protection layer;
wherein the intermediate layer is configured to dissolve in an organic solvent to separate the light-shielding layer from the adhesive layer when recycling the fingerprint identification device by dipping the fingerprint identification device in the organic solvent; the protection layer is configured to not dissolve in the organic solvent to protect the fingerprint identification element from being destroyed by the organic solvent when recycling the fingerprint identification device;
wherein both the adhesive layer and the intermediate layer have rectangular shapes; the intermediate layer has a length of D1 and a width of W1; the adhesive layer has a length of D2 and a width of W2; D1 is at least 50 μm larger than D2, and W1 is at least 50 μm larger than W2.

2. The fingerprint identification device of claim 1, wherein the intermediate layer is made of a material mainly containing acrylic resin.

3. The fingerprint identification device of claim 1, wherein the protection layer is made of a material mainly containing an epoxide resin.

4. The fingerprint identification device of claim 1, wherein the intermediate layer has a thickness H1 in a range from 5 μm to 10 μm; the adhesive layer has a thickness H2 in a range from 2 μm to 10 μm.

5. The fingerprint identification device of claim 4, wherein a distance H3 from a surface of the protection layer adjacent to the adhesive layer to the fingerprint identification element is in a range from about 1 μm to about 10 μm.

6. The fingerprint identification device of claim 5, wherein a total of the thickness H1 of the intermediate layer, the thickness H2 of the adhesive layer, and the distance H3 is less than 20 μm.

7. The fingerprint identification device of claim 5, wherein a distance H4 from a surface of the protection layer parallel to direction of the thickness H2 to the fingerprint identification element is more than 5 μm.

8. The fingerprint identification device of claim 1, wherein the cover is made of transparent glass or transparent polymer.

9. The fingerprint identification device of claim 1, wherein the light-shielding layer is made of an ink mainly containing epoxy resin.

10. The fingerprint identification device of claim 1, wherein the adhesive layer is made of an adhesive mainly containing epoxy resin.

11. The fingerprint identification device of claim 1, wherein the fingerprint identification element comprises a signal receiving layer, a signal sending layer formed on the signal receiving layer, and a thin film transistor array located between the signal receiving layer and the signal sending layer; the signal sending layer is formed on a surface of the thin film transistor array adjacent to the adhesive layer.

12. An electronic device comprising:
a fingerprint identification device comprising:
   a cover;
   a light-shielding layer formed on the cover;
   an adhesive layer formed on the light-shielding layer;
   an intermediate layer between the light-shielding layer and the adhesive layer;
   a protection layer formed on the adhesive layer; and
   a fingerprint identification element configured to identify a fingerprint, and the fingerprint identification element being embedded in the protection layer;
   wherein the intermediate layer is configured to dissolve in an organic solvent to separate the light-shielding layer from the adhesive layer when recycling the fingerprint identification device by dipping the fingerprint identification device in the organic solvent; the intermediate layer is configured to not dissolve in the organic solvent to protect the fingerprint identification element from being destroyed by the organic solvent when recycling the fingerprint identification device;
   wherein both the adhesive layer and the intermediate layer have rectangular shapes; the intermediate layer has a length of D1 and a width of W1; the adhesive layer has a length of D2 and a width of W2; D1 is at least 50 μm larger than D2, and W1 is at least 50 μm larger than W2.

13. The electronic device of claim 12, wherein the intermediate layer is made of a material mainly containing acrylic resin.

14. The electronic device of claim 12, wherein the intermediate layer has a thickness H1 in a range from 5 μm to 10 μm; the adhesive layer has a thickness H2 in a range from 2 μm to 10 μm.

15. The electronic device of claim 14, wherein a distance H3 from a surface of the protection layer adjacent to the adhesive layer to the fingerprint identification element is in a range from about 1 μm to about 10 μm; a total of the thickness H1 of the intermediate layer, the thickness H2 of the adhesive layer, and the distance H3 is less than 20 μm; a distance H4 from a surface of the protection layer parallel to direction of the thickness H2 to the fingerprint identification element is more than 5 μm.

16. The electronic device of claim 12, wherein the cover is made of transparent glass or transparent polymer; the light-shielding layer is made of an ink mainly containing epoxy resin; the adhesive layer is made of an adhesive mainly containing epoxy resin; the protection layer is made of a material mainly containing an epoxide resin, and the protection layer is insoluble in an organic solvent.

* * * * *